(12) United States Patent
Kongkanand et al.

(10) Patent No.: US 9,281,536 B2
(45) Date of Patent: Mar. 8, 2016

(54) MATERIAL DESIGN TO ENABLE HIGH MID-TEMPERATURE PERFORMANCE OF A FUEL CELL WITH ULTRATHIN ELECTRODES

(75) Inventors: Anusorn Kongkanand, West Henrietta, NY (US); Eric L. Thompson, Livonia, NY (US); Frederick T. Wagner, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1549 days.

(21) Appl. No.: 12/242,975

(22) Filed: Oct. 1, 2008

(65) Prior Publication Data

US 2010/0081025 A1    Apr. 1, 2010

(51) Int. Cl.
*H01M 4/86*    (2006.01)
*H01M 8/02*    (2006.01)
*H01M 8/04*    (2006.01)
*H01M 8/24*    (2006.01)

(52) U.S. Cl.
CPC ............ *H01M 8/241* (2013.01); *H01M 4/8657* (2013.01); *H01M 8/0228* (2013.01); *H01M 8/0245* (2013.01); *H01M 8/04171* (2013.01); *H01M 8/023* (2013.01); *H01M 8/0234* (2013.01); *H01M 8/0254* (2013.01); *H01M 8/04223* (2013.01); *H01M 8/04268* (2013.01); *Y02E 60/50* (2013.01)

(58) Field of Classification Search
CPC ............ H01M 8/0228; H01M 8/0245; H01M 8/04171

USPC ................. 429/452, 545, 456–457, 479–484, 429/507–508, 512, 514, 516, 517–520, 523, 429/529, 532, 534–535, 513, 450; 427/115
See application file for complete search history.

(56) References Cited

U.S. PATENT DOCUMENTS

| | | | |
|---|---|---|---|
| 6,511,766 B1 * | 1/2003 | Loutfy et al. | 429/454 |
| 2002/0058173 A1 * | 5/2002 | Alberti et al. | 429/30 |
| 2002/0090543 A1 * | 7/2002 | Okamoto | 429/44 |
| 2002/0146616 A1 * | 10/2002 | Yasuo et al. | 429/44 |
| 2003/0157397 A1 * | 8/2003 | Barton et al. | 429/44 |
| 2004/0096716 A1 * | 5/2004 | Pierpont et al. | 429/26 |
| 2005/0092597 A1 * | 5/2005 | O'Neil et al. | 204/192.15 |
| 2005/0112450 A1 * | 5/2005 | Wang et al. | 429/44 |
| 2006/0194095 A1 * | 8/2006 | Vyas et al. | 429/38 |
| 2006/0275642 A1 * | 12/2006 | Vyas et al. | 429/38 |
| 2006/0292431 A1 * | 12/2006 | Sohn et al. | 429/38 |
| 2007/0048590 A1 * | 3/2007 | Suh | 429/38 |
| 2007/0072040 A1 * | 3/2007 | Kouassi et al. | 429/34 |
| 2008/0044715 A1 * | 2/2008 | Vyas et al. | 429/38 |
| 2008/0145738 A1 * | 6/2008 | Benson | 429/34 |
| 2009/0117443 A1 * | 5/2009 | Trabold | H01M 8/0228 429/514 |

OTHER PUBLICATIONS

"Toray Carbon Fiber Paper 'TGP-H'," retrieved from http://www.fuelcellearth.com/pdf/Toray_specs.pdf, accessed Aug. 7, 2013.*

* cited by examiner

*Primary Examiner* — Barbara Gilliam
*Assistant Examiner* — Robert S Carrico
(74) *Attorney, Agent, or Firm* — Fraser Clemens Martin & Miller LLC; James D. Miller

(57) ABSTRACT

A fuel cell including at least one of a hydrophilic interlayer and a flow field treated to impart hydrophilic properties is disclosed, wherein the hydrophilic interlayer and the treated flow field militate against water accumulation in ultrathin electrodes of the fuel cell, particularly for cool-start operating conditions (i.e. about 0° C. to about 60° C.).

9 Claims, 6 Drawing Sheets

MATERIAL DESIGN TO ENABLE HIGH MID-TEMPERATURE PERFORMANCE OF A FUEL CELL WITH ULTRATHIN ELECTRODES

FIELD OF THE INVENTION

The invention relates to a fuel cell and more particularly to a fuel cell including at least one of a hydrophilic interlayer and a hydrophilic flow field to optimize water management within the fuel cell.

BACKGROUND OF THE INVENTION

A fuel cell has been proposed as a clean, efficient and environmentally responsible power source. Individual fuel cells can be stacked together in series to form a fuel cell stack. The fuel cell stack is capable of supplying a quantity of electricity sufficient to provide power to an electric vehicle.

One type of fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte. The PEM fuel cell typically includes three basic components: a cathode electrode, an anode electrode, and an electrolyte membrane. The cathode and anode typically include a finely divided catalyst, such as platinum, supported on carbon particles and mixed with an ionomer. The electrolyte membrane is sandwiched between the cathode and the anode to form the membrane-electrode-assembly (MEA).

The MEA is often disposed between porous diffusion media (DM) which facilitate a delivery of gaseous reactants, typically hydrogen and oxygen, for an electrochemical fuel cell reaction. In the fuel cell reaction, hydrogen gas is introduced at the anode where it reacts electrochemically in the presence of the catalyst to produce electrons and protons. The electrons are conducted from the anode to the cathode through an electrical circuit formed therebetween. Simultaneously, the protons pass through the electrolyte to the cathode where oxygen reacts electrochemically in the presence of the electrolyte and catalyst to produce oxygen anions. The oxygen anions react with the protons to form water as a reaction product.

A pair of electrically conductive end plates or bipolar plates generally sandwich the MEA to complete a single PEM fuel cell. Bipolar plates serve as current collectors for the anode and cathode, and have appropriate flow channels and openings formed therein for distributing the gaseous reactants (i.e., the $H_2$ & $O_2$/air) of the fuel cell over the surfaces of the electrodes.

As is well understood in the art, the electrolyte membrane within the fuel cell needs to have a certain relative humidity to effectively conduct protons. During operation of the fuel cell, moisture from the fuel cell electrochemical reaction and from external humidification may enter the flow channels of the bipolar plates. Typically, the moisture is forced along the flow channels by a pressure of a gaseous reactant, with this pressure being a primary mechanism for water removal from the flow channels. However, if the pressure is not sufficient, water can accumulate in a phenomenon known as stagnation. Stagnant water can block flow channels and reduce the overall efficiency of the fuel cell. A high degree of water accumulation or stagnation can also lead to fuel cell failure, particularly following a shut-down period under freezing ambient conditions where the accumulated water turns to ice. Both accumulated water and ice may cause gas starvation. Gas starvation is known to result in carbon corrosion when the starved fuel cell is one of a number of fuel cells in the fuel cell stack having an electrical load applied thereto.

Minimizing water stagnation has been possible, for example, by purging the channels periodically with the reactant gas at a higher flow rate or by having generally higher reactant recirculation rates. However, on the cathode of the MEA, this increases the parasitic power applied to the air compressor and reduces overall system efficiency. The use of hydrogen as a purge gas on the anode of the MEA can lead to reduced economy, poorer system efficiency, and increased system complexity.

A reduction in accumulated water in channels can also be accomplished by lessening inlet humidification. However, it is desirable to provide at least some relative humidity in the anode and cathode to hydrate the fuel cell membranes. Dry inlet gas has a desiccating effect on the membrane and can increase a fuel cell's ionic resistance. This method also negatively affects the long-term durability of the membrane.

In fuel cells having ultrathin electrodes, all of the reactions are concentrated in a small space, which leads to severe flooding on the cathode and dry out on the anode. Particularly at temperatures below 60° C., a saturated pressure of the water is too miniscule to effectively transport the water from the electrodes to the flow channels. As a result, a cool start performance of the fuel cell is detrimentally affected and causes a challenge for using the ultrathin electrodes in automotive applications.

Accordingly, it would be desirable to develop a water management feature that transports accumulating water away from fuel cells having ultrathin electrodes, wherein the feature is passive and improves fuel cell performance, particularly at cool-start operating conditions (i.e. about 0° C. to about 60° C.).

SUMMARY OF THE INVENTION

In concordance and agreement with the present invention a water management feature that transports accumulating water away from fuel cells having ultrathin electrodes, wherein the feature is passive and improves fuel cell performance, particularly at cool-start operating conditions (i.e. about 0° C. to about 60° C.), has surprisingly been discovered.

In one embodiment, the fuel cell stack comprises: an end plate having a flow field formed on a surface thereof; a plurality of bipolar plates, each bipolar plate having a flow field formed on at least one of a first surface and a second surface thereof; and a membrane electrode assembly disposed between the bipolar plates, the membrane electrode assembly including a membrane disposed between an anode and a cathode, wherein at least one of the flow field of the end plate and the flow field of the bipolar plates includes a hydrophilic surface, and wherein at least one of the anode and the cathode of the membrane electrode assembly includes an interlayer having a hydrophilic surface disposed adjacent thereto.

In another embodiment, the fuel cell stack comprises: at least one end plate having a flow field formed on a surface thereof; at least one bipolar plate having a flow field formed on at least one of a first surface and a second surface thereof; and a membrane electrode assembly including a membrane disposed between an ultrathin anode and an ultrathin cathode; and an interlayer having a hydrophilic surface disposed adjacent at least one of the anode and the cathode.

In another embodiment, the fuel cell stack comprises: at least one end plate having a flow field formed on a surface thereof; at least one bipolar plate having a flow field formed on at least one of a first surface and a second surface thereof, wherein at least one of the flow field of the at least one end plate and the flow field of at least one of the first surface and the second surface of the at least one bipolar plate includes a hydrophilic surface; a membrane electrode assembly disposed between each plate, the membrane electrode assembly including a membrane disposed between an anode and a cathode; and an interlayer disposed adjacent at least one of the anode and the cathode.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

For simplicity, only a two-cell stack (i.e. one bipolar plate) is illustrated and described herein, it being understood that a typical stack will have many more such cells and bipolar plates.

Figure 1:
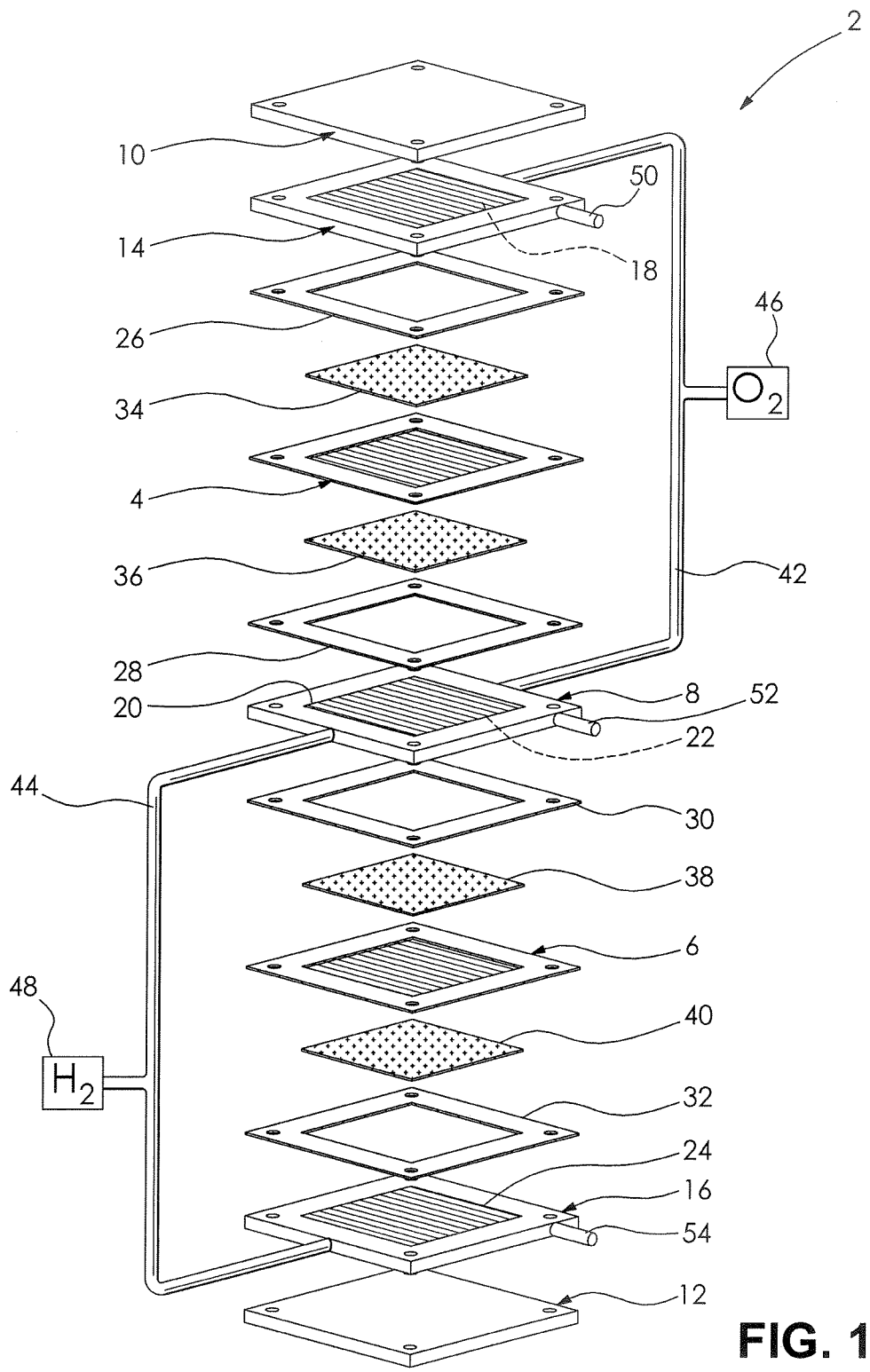
FIG. 1 is an exploded schematic perspective view of a fuel cell stack, showing two fuel cells.
Figure 2:
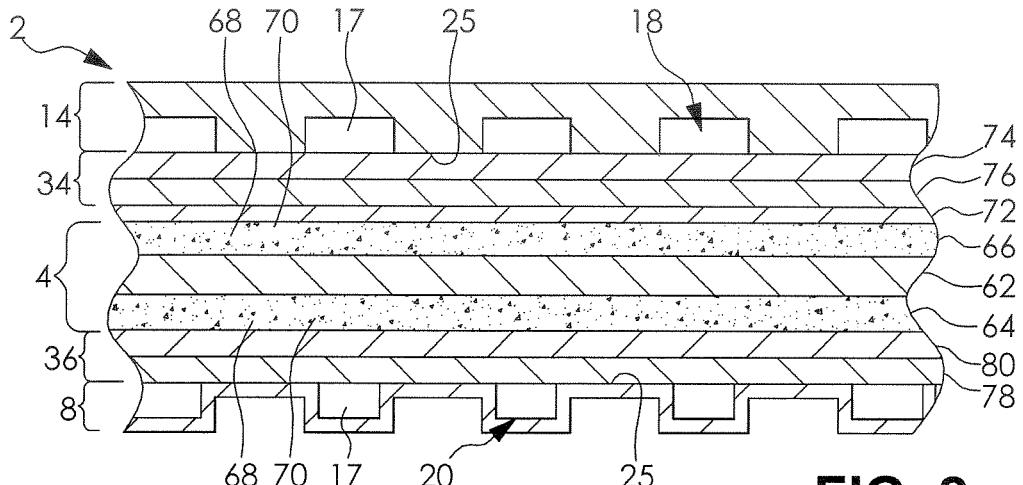
FIG. 2 is a fragmentary cross-sectional view of a PEM fuel cell according to an embodiment of the invention.

FIG. 1 depicts a two cell proton exchange membrane fuel cell stack 2 having a pair of membrane-electrode-assemblies (MEAs) 4, 6 separated from each other by an electrically conductive fluid distribution element 8, hereinafter a bipolar plate 8. The MEAs 4, 6 and bipolar plate 8, are stacked together between end elements 10, 12, and end plates 14, 16. Each of the end plate 14, both active surfaces of the bipolar plate 8, and the end plate 16 is provided with a respective flow field 18, 20, 22, 24, for distributing a fuel such as $H_2$ and an oxidant gas such as $O_2$, for example, to the MEAs 4, 6. As shown in FIG. 2, the flow fields 18, 20, 22, 24 include a plurality of flow paths or flow channels 17 and a plurality of lands 25. It is understood that the flow channels 17 can have any shape as desired such as trapezoidal, rectangular, triangular, waved, and serrated, for example. Nonconductive gaskets 26, 28, 30, 32 provide seals and electrical insulation between adjacent electrically conductive components of the fuel cell stack 2.

Porous electrically conductive diffusion media (DM) 34, 36, 38, 40 abut electrode faces of the MEAs 4, 6. Such DM's 34, 36, 38, 40 may be constructed of a material that facilitates dispersion of the reactants over the electrode faces and electrolyte membrane of the MEAs 4, 6 such as a woven graphite, a graphitized sheet, and carbon paper, for example. The end plates 14, 16 are forced against the DM's 34, 40 respectively, while the bipolar plate 8 abuts the DM 36 on an anode face of the MEA 4, configured to accept a hydrogen-bearing reactant, and abuts DM 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42, while the hydrogen-bearing reactant is supplied to an anode side of the fuel cell stack 2 from a storage tank 48, by an appropriate supply conduit 44. Alternatively, ambient air may be supplied to the cathode side as an oxygen-bearing reactant and hydrogen to the anode side from a methanol or gasoline reformer, or the like. An exhaust conduit (not shown) for both the anode and the cathode sides of the MEAs 4, 6 is also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 are also provided.

FIG. 2 shows a portion of a fuel cell of the assembled fuel cell stack 2 according to an embodiment of the invention. For simplicity, only the MEA 4 is further described hereafter, it being understood that additional MEAs are substantially similar in structure. The MEA 4 includes a proton exchange membrane (PEM) 62 sandwiched between an ultrathin anode 64 and an ultrathin cathode 66. In the embodiment shown, the anode 64 and the cathode 66 are each less than 2 μm thick. It is understood, however, that the anode 64 and the cathode 66 can have any thicknesses as desired. The anode 64 and the cathode 66 typically include a porous conductive material 68 with catalytic particles 70 distributed therein to facilitate the electrochemical reaction of the oxygen in the cathode 66 and the hydrogen in the anode 64.

Figure 3:
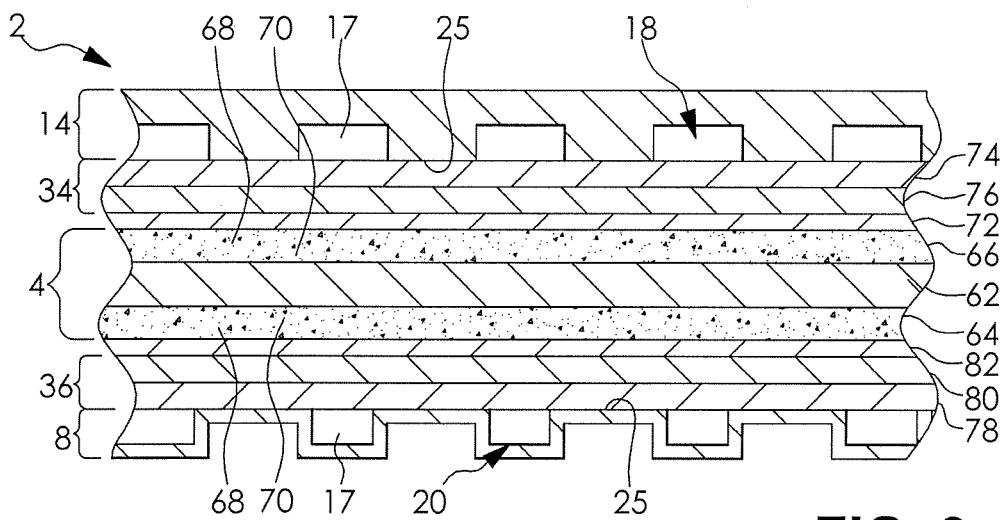
FIG. 3 is a fragmentary cross-sectional view of a PEM fuel cell having two hydrophilic interlayers.

In the embodiment shown, an interlayer 72 having a hydrophilic surface is disposed between the cathode 66 and the DM 34. It is understood that another interlayer 82 having a hydrophilic surface can be disposed between the anode 64 and the DM 36 as shown in FIG. 3, if desired. The hydrophilic surface of the interlayers 72, 82 can be produced by a surface treatment such as applying a coating to a surface of the interlayers 72, 82, machining a surface of the interlayers 72, 82, and the like, for example. It is understood that the coating applied to the surface of the interlayers 72, 82 can be an electrically conductive material such as a hydrophilic polymer, a carbon and ionomer, a functionalized carbon, a reducible oxide, an interstitial compound, and the like, for example. The interlayers 72, 82 can also be produced from an electrically conductive material such as a hydrophilic polymer thin layer, a carbon and ionomer layer, a functionalized carbon layer, a reducible oxide layer, an interstitial compound layer, and the like, for example. It is understood, however, that the interlayers 72, 82 can also be produced by applying a hydrophilic coating to the cathode 66 and the anode 64, respectively, machining the cathode 66 and the anode 64, respectively, and the like, for example. It is further understood that the coating applied to the cathode 66 and the anode 64 can be an electrically conductive material such as a hydrophilic polymer, a carbon and ionomer, a functionalized carbon, a reducible oxide, an interstitial compound, and the like, for example. The interlayers 72, 82 are adapted to militate against excess product water from accumulating on at least one of the cathode 66 and the anode 64, and permit the reactants to access the catalytic particles 70 thereof. The interlayers 72, 82 may be from about 0.5 µm to about 15 µm thick, for example. In the embodiment shown, the interlayers 72, 82 are from about 0.5 µm to about 3 µm thick. It is understood, however, that the interlayers 72, 82 can have any thicknesses as desired.

The DM 34 is disposed between the end plate 14 and the interlayer 72, with a porous substrate layer 74 of the DM 34 disposed adjacent the flow field 18 of the end plate 14. A microporous layer 76 of the DM 34 is disposed adjacent the interlayer 72. The DM 36 is disposed between the anode side of the bipolar plate 8 and one of the anode 64 as shown in FIG. 2 and the interlayer 82 as shown in FIG. 3, with a porous substrate layer 78 of the DM 36 disposed adjacent the flow field 20 of the bipolar plate 8. A microporous layer 80 of the DM 36 is disposed adjacent one of the anode 64 as shown in FIG. 2 and the interlayer 82 as shown in FIG. 3. It is understood that the interlayers 72, 82 are not limited to the type of DM employed or the presence of microporous layers 76, 80 thereof.

In use, hydrogen is supplied to the end plate 16 and the anode side of the bipolar plate 8 of the fuel cell stack 2 from a hydrogen source 48. Oxygen is supplied as the oxidant to the end plate 14 and the cathode side of the bipolar plate 8 from an oxygen source 46. Alternatively, ambient air may be supplied to the cathode side as an oxidant and hydrogen may be supplied to the anode side from a methanol or gasoline reformer.

At the anode 64, the hydrogen is catalytically split into protons and electrons. The protons formed permeate through the PEM 62 to the cathode 66. The electrons travel along an external load circuit (not shown) to the cathode 66 of the MEA 4, thus creating a current output of the fuel cell stack 2. Meanwhile, a stream of oxygen is delivered to the cathode 66 of the MEA 4. At the cathode 66, oxygen molecules react with the protons permeating through the PEM 62, and the electrons arriving through the external circuit to form water (not shown). Although, the anode 64 does not encounter the same liquid water management issues as the cathode 66, in that product water is only generated on the cathode 66, some water can accumulate on the anode 64 due to back diffusion through the PEM 62. The DM's 34, 36 remove the excess water during wet operating conditions or at wet regions of the fuel cells of the fuel cell stack 2 to avoid flooding the anode 64 and the cathode 66. During dry operating conditions or at dry regions of the fuel cells of the fuel cell stack 2, the DM's 34, 36 maintain a degree of hydration of the PEM 62 to obtain decent proton conductivity. The interlayers 72, 82 militate against the excess water from accumulating on the cathode 66 and the anode 64, respectively, and permit the reactants to access the catalytic particles 70 thereof. Water management in the fuel cell stack 2 is integral to successful long-term operation of the fuel cell stack 2.

Figure 4:
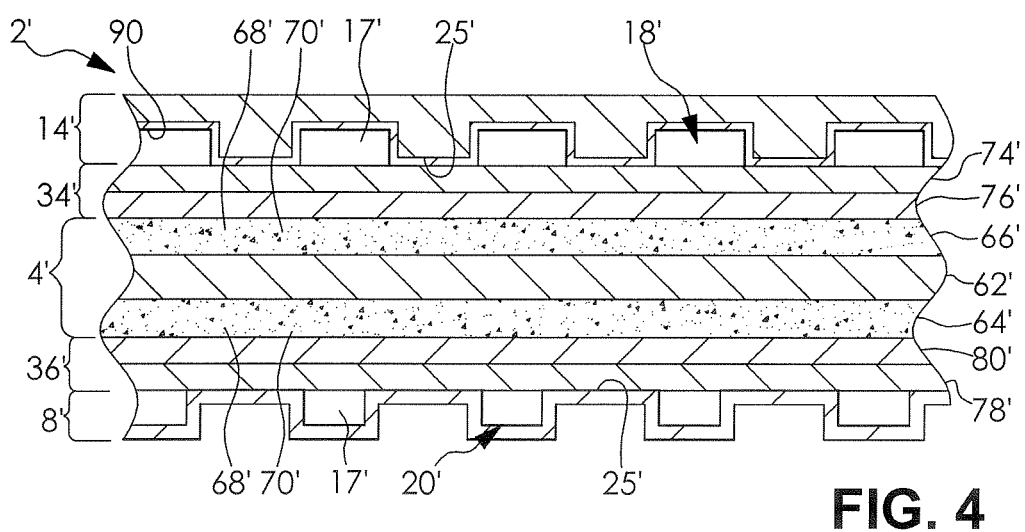
FIG. 4 is a fragmentary cross-sectional view of a PEM fuel cell according to another embodiment of the invention, showing a flow field treated to impart hydrophilic properties.
Figure 5:
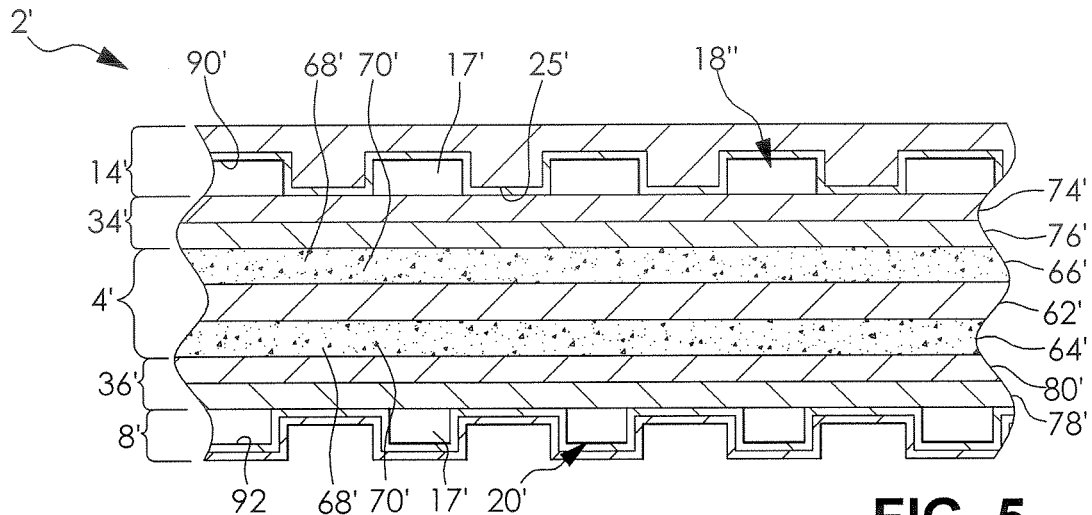
FIG. 5 is a fragmentary cross-sectional view of a PEM fuel cell, showing two flow fields treated to impart hydrophilic properties.

FIGS. 4 and 5 show a portion of a fuel cell of an assembled fuel cell stack 2' similar to that shown in FIGS. 2 and 3 according to another embodiment of the invention. Reference numerals for similar structure in respect of the description of FIGS. 2 and 3 are repeated in FIGS. 4 and 5 with a prime (') symbol.

For simplicity, only the MEA 4' is further described hereafter, it being understood that additional MEAs are substantially similar in structure. The MEA 4' includes a PEM 62' sandwiched between an ultrathin anode 64' and an ultrathin cathode 66'. In the embodiment shown, the anode 64' and the cathode 66' are each less than 2 µm thick. It is understood, however, that the anode 64' and the cathode 66' can have any thicknesses as desired. The anode 64' and the cathode 66' typically include a porous conductive material 68' with catalytic particles 70' distributed therein to facilitate the electrochemical reaction of the oxygen in the cathode 66' and the hydrogen in the anode 64'.

A DM 34' is disposed between the end plate 14' and the cathode 66', with a porous substrate layer 74' of the DM 34' disposed adjacent the flow field 18' of the end plate 14'. A microporous layer 76' of the DM 34' is disposed adjacent the cathode 66'. A DM 36' is disposed between the anode side of the bipolar plate 8' and the anode 64', with a porous substrate layer 78' of the DM 36' disposed adjacent the flow field 20' of the bipolar plate 8'. A microporous layer 80' of the DM 36' is disposed adjacent the anode 64'.

Flow fields 18', 20', of the end plate 14' and the bipolar plate 8', respectively, can be adapted to efficiently drain product water from the DM 34', 36' by a non-mechanical means such as by capillary action, for example, thereby minimizing water saturation in the DM's 34', 36' and mass transfer resistance of the reactants. In the embodiment shown, the flow field 18' is treated to impart hydrophilic properties such as having a hydrophilic surface 90, for example. As a non-limiting example, the flow field 18' includes at least one of the hydrophilic surface 90 and a plurality of pores (not shown) formed therein adjacent the DM 34'. It is understood that the hydrophilic surface 90 of the flow field 18' can be produced by any surface treatment such as applying a hydrophilic coating as shown in FIGS. 4 and 5, applying an adsorbed reagent, forming the flow field 18' from a hydrophilic material, machining a surface thereof, forming a plurality of pores therein, and the like, for example. Examples of suitable hydrophilic coatings include, but are not limited to, metal oxides. As illustrated, a plurality of channels 17' and a plurality of lands 25' of the flow field 18' are treated to impart hydrophilic properties. It is understood, however, that only one of the channels 17' and the lands 25' can be treated to impart hydrophilic properties, if desired. The flow field 18', having hydrophilic properties, is adapted to wick water away from the DM 34' by a capillary action. It is understood that the flow field 20' can also be treated to impart hydrophilic properties, if desired. In a non-limiting example shown in FIG. 5, the flow field 20' includes a hydrophilic surface 92. It is understood that the hydrophilic surface 92 of the flow field 20' can be produced by any surface treatment such as applying a hydrophilic coating as shown in FIG. 5, applying an adsorbed reagent, forming the flow field 20' from a hydrophilic material, machining a surface thereof, forming a plurality of pores therein, and the like, for example. Examples of suitable hydrophilic coatings include, but are not limited to, metal oxides. As illustrated, a plurality of channels 17' and a plurality of lands 25' of the flow field 18' are treated to impart hydrophilic properties. It is understood, however, that only one of the channels 17' and the lands 25' can be treated to impart hydrophilic properties, if desired. The flow field 20', having hydrophilic properties, is adapted to wick water away from the DM 36' by a capillary action. It is understood that the flow fields 18', 20' are not limited to the type of DM employed or the presence of microporous layers 76', 80' thereof.

In use, hydrogen is supplied to the end plate and the anode side of the bipolar plate 8' of the fuel cell stack 2' from a hydrogen source. Oxygen is supplied as the oxidant to the end plate 14' and the cathode side of the bipolar plate 8' from an oxygen source. Alternatively, ambient air may be supplied to the cathode side as an oxidant and hydrogen may be supplied to the anode side from a methanol or gasoline reformer.

At the anode 64', the hydrogen is catalytically split into protons and electrons. The protons formed permeate through the PEM 62' to the cathode 66'. The electrons travel along an external load circuit (not shown) to the cathode 66' of the MEA 4', thus creating a current output of the fuel cell stack 2'. Meanwhile, a stream of oxygen is delivered to the cathode 66' of the MEA 4'. At the cathode 66', oxygen molecules react with the protons permeating through the PEM 62', and the electrons arriving through the external circuit to form water (not shown). Although, the anode 64' does not encounter the same liquid water management issues as the cathode 66', in that product water is only generated on the cathode 66', some water can accumulate on the anode 64' due to back diffusion through the PEM 62'. The DM's 34', 36' remove the excess water during wet operating conditions or at wet regions of the fuel cells of the fuel cell stack 2' to avoid flooding the anode 64' and the cathode 66'. During dry operating conditions or at dry regions of the fuel cells of the fuel cell stack 2', the DM's 34', 36' maintain a degree of hydration of the PEM 62' to obtain decent proton conductivity. The hydrophilic properties of the flow fields 18', 20', particularly the hydrophilic surfaces 90, 92, militate against excess water from accumulating on the cathode 66' and the anode 64', respectively, and permit the reactants to access the catalytic particles 70' thereof. The hydrophilic properties enhance water management of the anode 64', the cathode 66', and the DM's 34', 36', and militate against flooding thereof, while facilitating increased water removal. Water management in the fuel cell stack 2' is integral to successful long-term operation of the fuel cell stack 2'.

Figure 6:
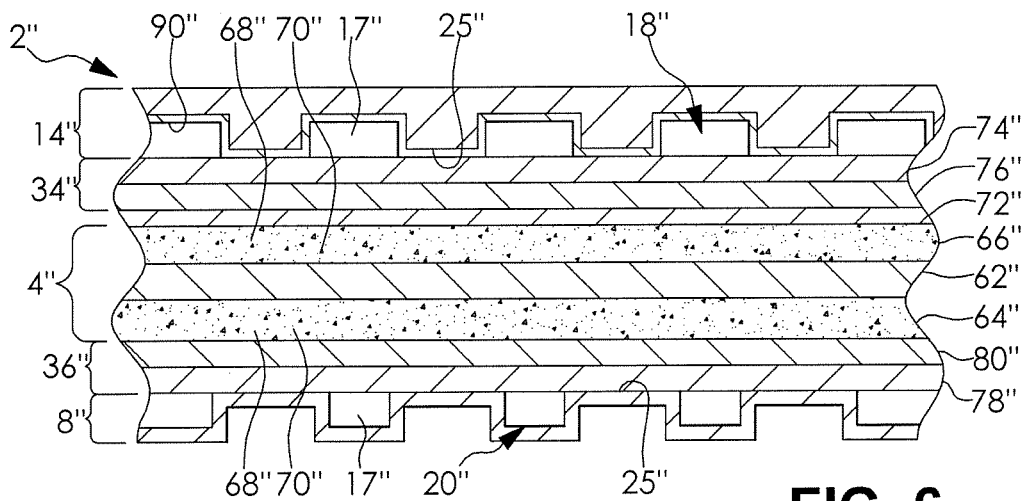
FIG. 6 is a fragmentary cross-sectional view of a PEM fuel cell according to another embodiment of the invention, showing a hydrophilic interlayer and a flow field treated to impart hydrophilic properties.
Figure 7:
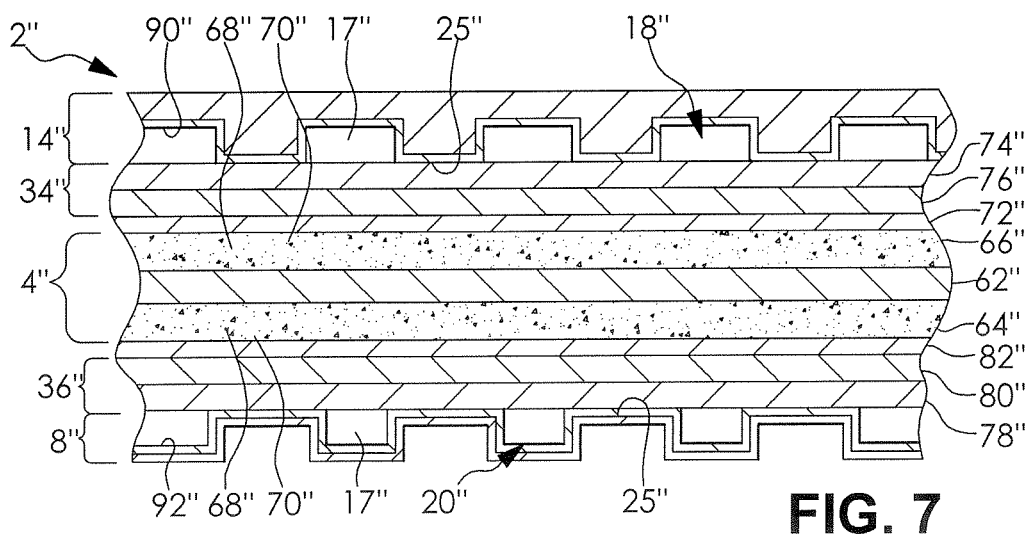
FIG. 7 is a fragmentary cross-sectional view of a PEM fuel cell, showing two hydrophilic interlayers and two flow fields treated to impart hydrophilic properties.

FIGS. 6 and 7 show a portion of a fuel cell of an assembled fuel cell stack 2" similar to that shown in FIGS. 2, 3, 4, and 5 according to another embodiment of the invention. Reference numerals for similar structure in respect of the description of FIGS. 2, 3, 4, and 5 are repeated in FIGS. 6 and 7 with a prime (") symbol.

For simplicity, only the MEA 4" is further described hereafter, it being understood that additional MEAs are substantially similar in structure. The MEA 4" includes a PEM 62" sandwiched between an ultrathin anode 64" and an ultrathin cathode 66". In the embodiment shown, the anode 64" and the cathode 66" are each less than 2 μm thick. It is understood, however, that the anode 64" and the cathode 66" can have any thicknesses as desired. The anode 64" and the cathode 66" typically include a porous conductive material 68" with catalytic particles 70" distributed therein to facilitate the electrochemical reaction of the oxygen in the cathode 66" and the hydrogen in the anode 64".

In the embodiment shown, an interlayer 72" having a hydrophilic surface is disposed between the cathode 66" and a DM 34". It is understood that another interlayer 82" having a hydrophilic surface can be disposed between the anode 64" and a DM 36" as illustrated in FIG. 7, if desired. The hydrophilic surface of the interlayers 72", 82" can be produced by a surface treatment such as applying a coating to a surface of the interlayers 72", 82", machining a surface of the interlayers 72", 82", and the like, for example. It is understood that the coating applied to the surface of the interlayers 72", 82" can be an electrically conductive material such as a hydrophilic polymer, a carbon and ionomer, a functionalized carbon, a reducible oxide, an interstitial compound, and the like, for example. The interlayers 72", 82" can also be produced from an electrically conductive material such as a hydrophilic polymer thin layer, a carbon and ionomer layer, a functionalized carbon layer, a reducible oxide layer, and interstitial compound layer, and the like, for example. It is understood, however, that the interlayers 72", 82" can also be produced by applying a hydrophilic coating to the cathode 66" and the anode 64", respectively, machining the cathode 66" and the anode 62", respectively, and the like, for example. It is further understood that the coating applied to the cathode 66" and the anode 64" can be an electrically conductive material such as a hydrophilic polymer, a carbon and ionomer, a functionalized carbon, a reducible oxide, an interstitial compound, and the like, for example. The interlayers 72", 82" are adapted to militate against excess product water from accumulating on the cathode 66" and the anode 64", and permit the reactants to access the catalytic particles 70" thereof. The interlayers 72", 82" may be from about 0.5 μm to about 15 μm thick, for example. In the embodiment shown, the interlayers 72", 82" are from about 0.5 μm to about 3 μm thick. It is understood, however, that the interlayers 72", 82" can have any thicknesses as desired.

The DM 34" is disposed between the end plate 14" and the interlayer 72", with a porous substrate layer 74" of the DM 34" disposed adjacent the flow field 18" of the end plate 14". A microporous layer 76" of the DM 34" is disposed adjacent the interlayer 72". The DM 36" is disposed between the anode side of the bipolar plate 8" and one of the anode 64" as shown in FIG. 6 and the interlayer 82" as shown in FIG. 7, with a porous substrate layer 78" of the DM 36" disposed adjacent the flow field 20" of the bipolar plate 8". A microporous layer 80" of the DM 36" is disposed adjacent one of the anode 64" as shown in FIG. 6 and the interlayer 82" as shown in FIG. 7. It is understood that the interlayers 72", 82" are not limited to the type of DM employed or the presence of microporous layers 76", 80" thereof.

Flow fields 18", 20", of the end plate 14" and the bipolar plate 8", respectively, can be adapted to efficiently drain product water from the DM's 34", 36" by a non-mechanical means such as by capillary action, for example, thereby minimizing water saturation in the DM's 34", 36" and mass transfer resistance of the reactants. In the embodiment shown, the flow field 18" is treated to impart hydrophilic properties such as having a hydrophilic surface 90", for example. As a non-limiting example, the flow field 18" includes at least one of the hydrophilic surface 90" and a plurality of pores (not shown) formed therein adjacent the DM 34". It is understood that the hydrophilic surface 90" of the flow field 18" can be produced by any surface treatment such as applying a hydrophilic coating as shown in FIGS. 6 and 7, applying an adsorbed reagent, forming the flow field 18'" from a hydrophilic material, machining a surface thereof, forming a plurality of pores, therein, and the like, for example. As illustrated, a plurality of channels 17" and a plurality of lands 25" of the flow field 18" are treated to impart hydrophilic properties. It is understood, however, that only one of the channels 17" and the lands 25" can be treated to impart hydrophilic properties, if desired. The flow field 18", having hydrophilic properties, is adapted to wick water away from the DM 34" by a capillary action. It is understood that the flow field 20" can also be treated to impart hydrophilic properties, if desired. In a non-limiting example shown in FIG. 7, the flow field 20" includes a hydrophilic surface 92". It is understood that the hydrophilic surface 92" of the flow field 20" can be produced by any surface treatment such as applying a hydrophilic coating as shown in FIG. 7, applying an adsorbed reagent, forming the flow field 20'" from a hydrophilic material, machining a surface thereof, forming a plurality of pores therein, and the like, for example. As illustrated, a plurality of channels 17" and a plurality of lands 25" of the flow field 20" are treated to impart hydrophilic properties. It is understood, however, that only one of the channels 17" and the lands 25" can be treated to impart hydrophilic properties, if desired. The flow field 20'", having hydrophilic properties, is adapted to wick water away from the DM 34" by a capillary action. It is understood that the flow fields 18", 20" are not limited to the type of DM employed or the presence of microporous layers 76", 80" thereof.

In use, hydrogen is supplied to the end plate and the anode side of the bipolar plate 8" of the fuel cell stack 2" from a hydrogen source. Oxygen is supplied as the oxidant to the end plate 14" and the cathode side of the bipolar plate 8" from an oxygen source. Alternatively, ambient air may be supplied to the cathode side as an oxidant and hydrogen may be supplied to the anode side from a methanol or gasoline reformer.

At the anode 64", the hydrogen is catalytically split into protons and electrons. The protons formed permeate through the PEM 62" to the cathode 66". The electrons travel along an external load circuit (not shown) to the cathode 66" of the MEA 4", thus creating a current output of the fuel cell stack 2". Meanwhile, a stream of oxygen is delivered to the cathode 66" of the MEA 4". At the cathode 66", oxygen molecules react with the protons permeating through the PEM 62", and the electrons arriving through the external circuit to form water (not shown). Although, the anode 64" does not encounter the same liquid water management issues as the cathode 66", in that product water is only generated on the cathode 66", some water can accumulate on the anode 64" due to back diffusion through the PEM 62". The DM's 34", 36" remove the excess water during wet operating conditions or at wet regions of the fuel cells of the fuel cell stack 2" to avoid flooding the anode 64" and the cathode 66". During dry operating conditions or at dry regions of the fuel cells of the fuel cell stack 2", the DM's 34", 36" maintain a degree of hydration of the PEM 62" to obtain decent proton conductivity. The interlayers 72", 82" militate against the excess water from accumulating on the cathode 66" and the anode 64", respectively, and permit the reactants to access the catalytic particles 70" thereof.

The hydrophilic properties of the flow fields 18", 20", particularly the hydrophilic surfaces 90", 92", further militate against excess water from accumulating on the cathode 66" and the anode 64'", respectively, and permit the reactants to access the catalytic particles 70" thereof. The hydrophilic properties enhance water management of the anode 64", the cathode 66", and the DM's 34", 36", and militate against flooding thereof, while facilitating increased water removal. Water management in the fuel cell stack 2" is integral to successful long-term operation of the fuel cell stack 2".

The fuel cell stacks 2, 2', 2" were tested under different operating conditions. FIGS. 8, 9, 10, and 11 show the results in terms of current density (A/cm$^2$) versus voltage (V) at temperatures of 30° C., 40° C., 50° C., 60° C., and 80° C. It is understood that testing the fuel cell stacks 2, 2', 2" at temperatures of 30° C., 40° C., 50° C., and 60° C. simulated cool start operating conditions and testing at a temperature of 80° C. simulated a normal operating condition.

Figure 8:
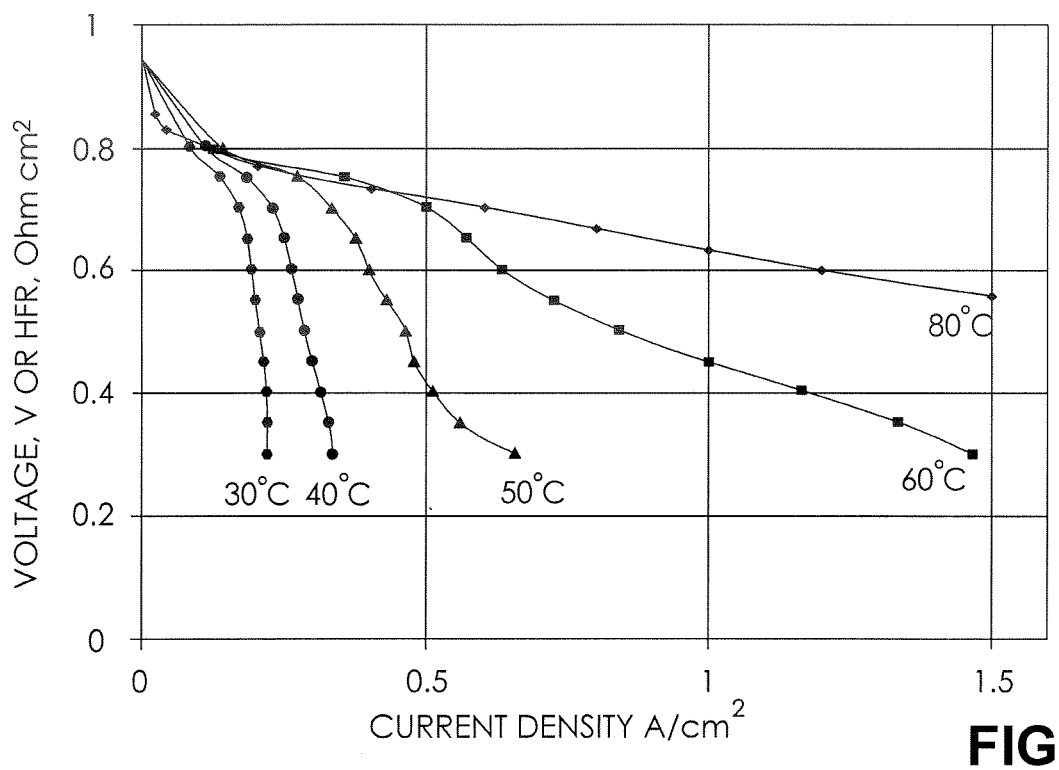
FIG. 8 is a graph showing current voltage performance of a typical fuel cell stack, including a MEA with ultrathin electrodes, at high mid-temperatures.

FIG. 8 shows the current density versus voltage for a typical fuel cell stack having a standard MEA with ultrathin electrode and flow fields. The fuel cell stack was operated at 150 kPa and 100% relative humidity at temperatures of 30° C., 40° C., 50° C., 60° C., and 80° C.

Figure 9:
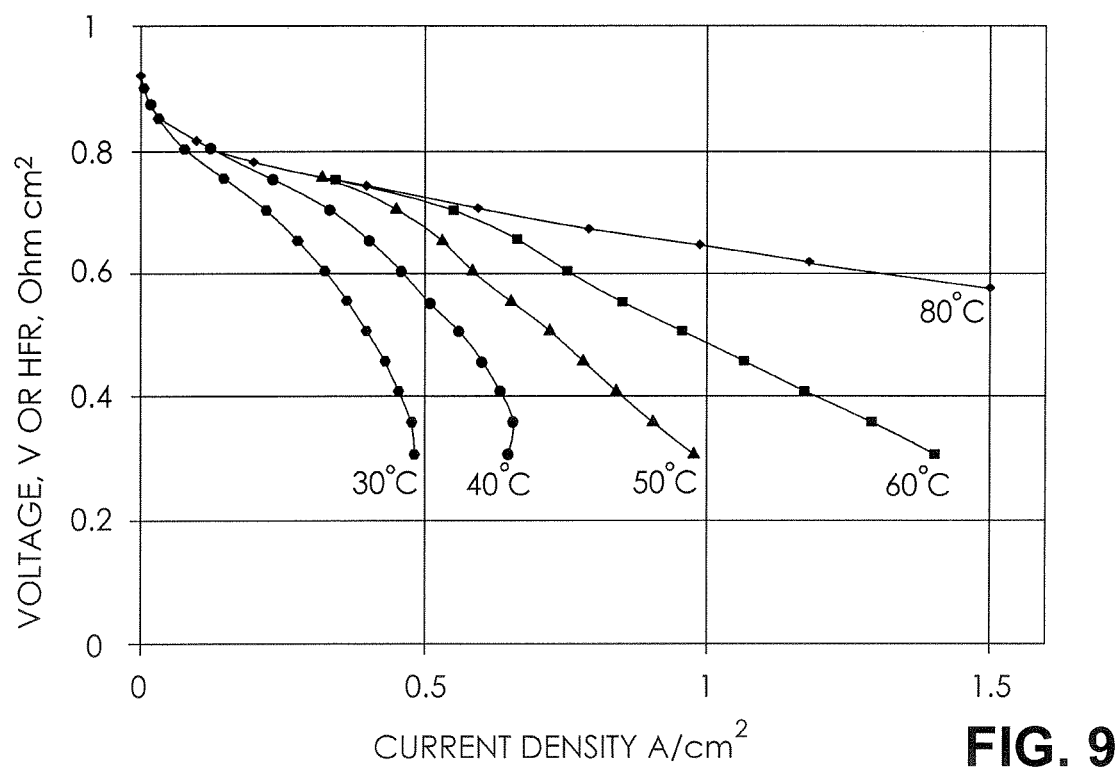
FIG. 9 is a graph showing current voltage performance of a fuel cell stack having a hydrophilic interlayer at high mid-temperatures.

FIG. 9 shows the current density versus voltage for the fuel cell stack 2 having the hydrophilic interlayer 72 produced from a carbon and ionomer material about 3 μm thick disposed adjacent the cathode 66. The fuel cell stack 2 was operated at 150 kPa and 100% relative humidity at temperatures of 30° C., 40° C., 50° C., 60° C., and 80° C. The curves for temperatures 30° C., 40° C., and 50° C. show a significant increase in current density, about 2×, as compared with the typical fuel cell stack at the same voltage. The curves for temperatures 60° C. and 80° C. show no appreciable difference.

Figure 10:
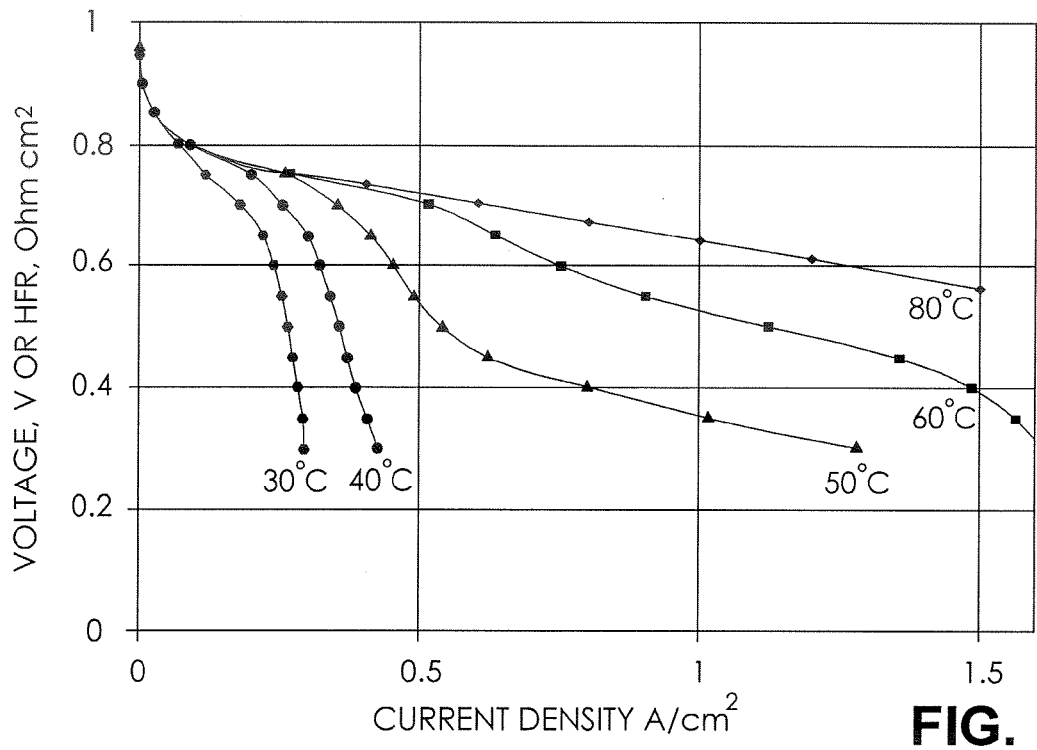
FIG. 10 is a graph showing current voltage performance of a fuel cell stack having a flow field treated to impart hydrophilic properties at high mid-temperatures.

FIG. 10 shows the current density versus voltage for the fuel cell stack 2' including the flow fields 18', 20' having hydrophilic properties. The fuel cell stack 2' was operated at 150 kPa and 100% relative humidity at temperatures of 30° C., 40° C., 50° C., 60° C., and 80° C. The curves for temperatures 30° C., 40° C., and 80° C. show no appreciable difference in current density as compared with the typical fuel cell stack having standard flow fields. The curves for temperatures 50° C. and 60° C. show an appreciable increase, especially at lower voltages.

Figure 11:
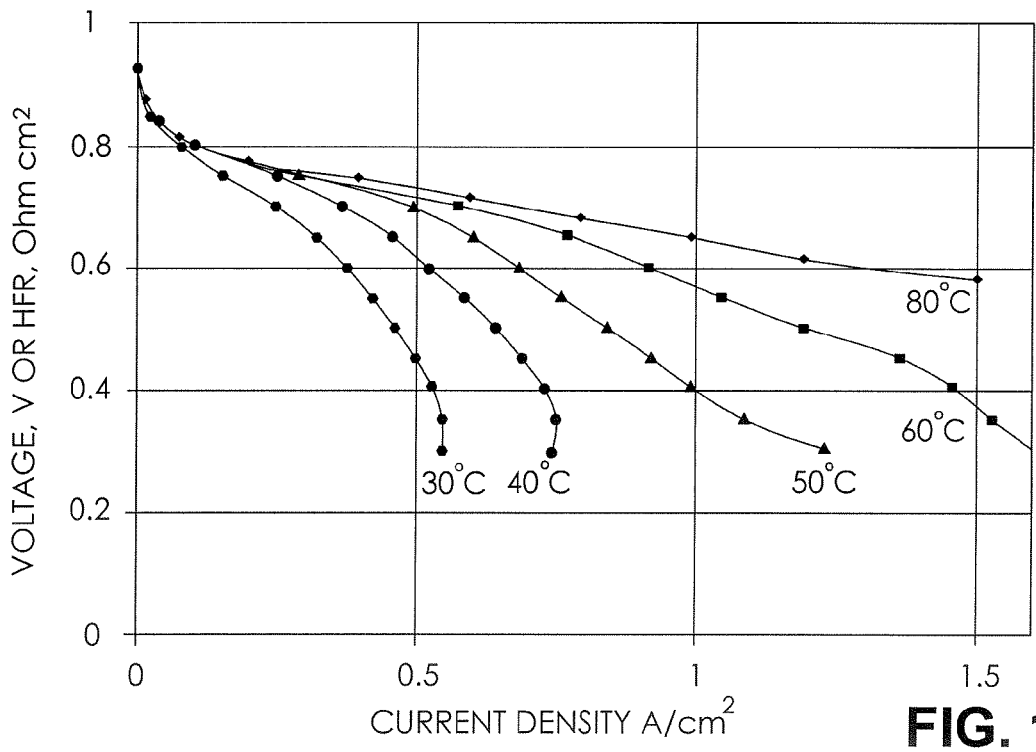
FIG. 11 is a graph showing current voltage performance of a fuel cell stack having a hydrophilic interlayer and a flow field treated to impart hydrophilic properties at high mid-temperatures.

FIG. 11 shows the current density versus voltage for the fuel cell stack 2" having the hydrophilic interlayer 72" produced from a carbon and ionomer material about 1 μm thick disposed adjacent the cathode 66" and including flow fields 18", 20" having hydrophilic properties. The fuel cell stack 2" was operated at 150 kPa and 100% relative humidity at temperatures of 30° C., 40° C., 50° C., 60° C., and 80° C. The curves for temperatures 30° C., 40° C., 50° C., and 60° C. show a significant increase in current density, about 2×, as compared with the typical fuel cell stack at the same voltage. The curve for temperature 80° C. shows no appreciable difference.

Figure 12:
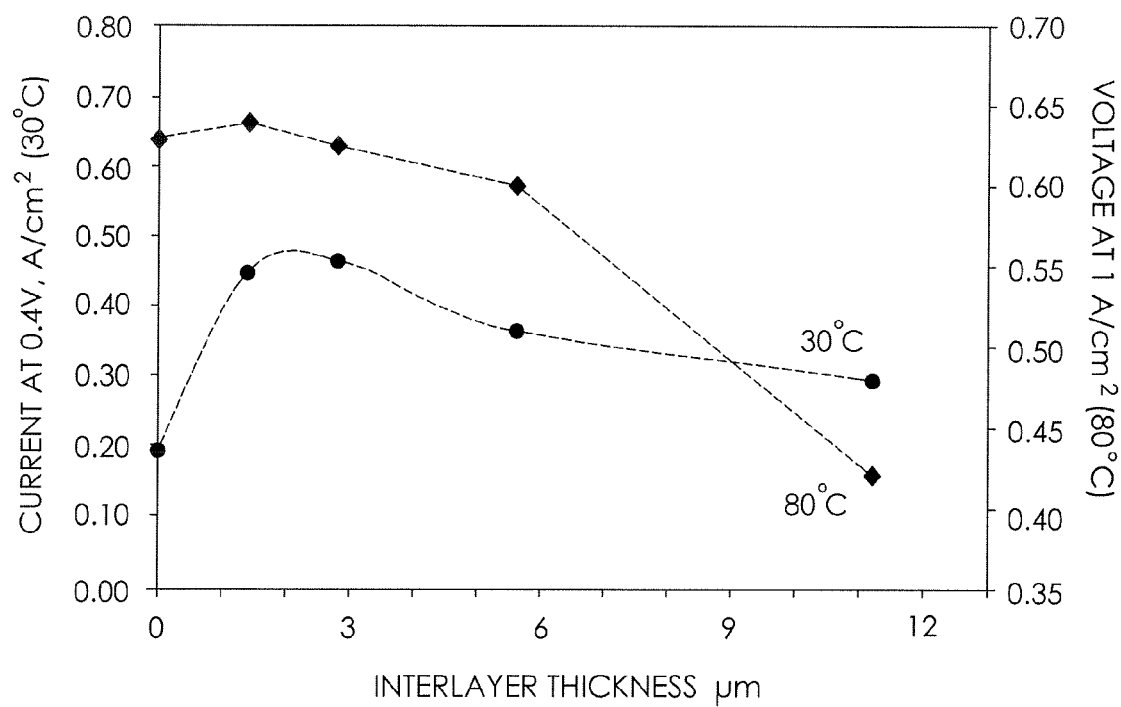
FIG. 12 is a graph showing an effect of a thickness of a hydrophilic interlayer upon performance of a fuel cell stack at a cool start operating temperature and at a normal operating temperature.

FIG. 12 shows an effect of the thickness of the hydrophilic interlayer 72 produced from a carbon and ionomer material upon performance of the fuel cell stack 2 at a cool start operating temperature (30° C.) and at a normal operating temperature (80° C.). The cool start performance of fuel cell stack 2 increases as the thickness of the hydrophilic interlayer 72 increases from about 0 μm to about 3 μm thick. However, over the thickness range from about 3 μm to about 12 μm thick, the cool-start performance slightly decreases and substantially plateaus. Further, the normal performance of fuel cell stack 2 decreases as the thickness of the hydrophilic interlayer 72 increases from about 0 μm to about 12 μm thick. The decrease in normal performance of the fuel cell stack 2 is likely caused by an increase in water accumulation and higher mass transport resistance in the cathode 66. As illustrated in the example, the optimized thickness for the hydrophilic interlayer 72 produced from a carbon and ionomer material is about 0.5 μm to about 3 μm thick. It is understood, however, that the optimized thickness is dependent upon a porosity and pore size of the material used to produce the hydrophilic interlayer 72.

Accordingly, the benefit of different hydrophilic modifications to a fuel cell stack having ultrathin anodes and ultrathin cathodes at relatively humid operating conditions for high mid-temperatures has been illustrated in the above examples. The disposition of at least one hydrophilic interlayer together with flow fields having hydrophilic properties have been shown to maximize the current density and optimize water management capabilities within the fuel cell stack, particularly at cool start operating conditions (i.e. about 0° C. to about 60° C.).

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell stack comprising:
   an end plate having a flow field formed on a first surface thereof and a substantially planar second surface, the flow field of the end plate includes a hydrophilic surface;
   a bipolar plate, the bipolar plate having a flow field formed on a first surface and a second surface thereof, wherein at least one of the flow fields of the bipolar plate includes a hydrophilic surface, wherein the hydrophilic surface of the at least one of the flow fields of the bipolar plate is one of a coating of a metal oxide, an adsorbed reagent, a machined surface, and a plurality of pores formed therein;
   a membrane electrode assembly disposed intermediate the end plate and the bipolar plate, the membrane electrode assembly including a proton exchange membrane disposed between an anode and a cathode, the anode and the cathode each including a porous conductive material with catalytic particles distributed therein, wherein each of the anode and the cathode is less than 2 μm thick;
   a plurality of diffusion media, each of the diffusion media having a porous layer and a microporous layer, the porous layer of a first one of the diffusion media disposed adjacent the hydrophilic surface of the flow field of the end plate and the porous layer of a second one of the diffusion media disposed adjacent the hydrophilic surface of the at least one of the flow fields of the bipolar plate; and
   at least two interlayers, each of the interlayers having a hydrophilic surface about 1 μm thick, wherein the hydrophilic surface of each of the interlayers is a carbon and ionomer material, a first one of the interlayers disposed between the microporous layer of the first one of the diffusion media and the membrane electrode assembly and a second one of the interlayers disposed between the microporous layer of the second one of the diffusion media and the membrane electrode assembly, the first one of the interlayers contacting the cathode, the second one of the interlayers contacting the anode.

2. The fuel cell stack according to claim 1, wherein the hydrophilic surface of each of the interlayers is produced by at least one of applying a coating of the carbon and ionomer material to a surface of the interlayer and forming the interlayer from the carbon and ionomer material.

3. The fuel cell stack according to claim 1, wherein each of the interlayers is from about 0.5 μm to about 15 μm thick.

4. The fuel cell stack according to claim 3, wherein each of the interlayers is from about 0.5 μm to about 3 μm thick.

5. A fuel cell stack comprising:
   at least one end plate having a flow field formed on a first surface thereof and a substantially planar second surface, the flow field of the end plate includes a hydrophilic surface;
   at least one bipolar plate having a flow field formed on a first surface and a second surface thereof, wherein at least one of the flow fields of the at least one bipolar late includes a hydrophilic surface, wherein the hydrophilic surface of the at least one of the flow fields of the at least one bipolar plate is a coating of a metal oxide;
   at least one membrane electrode assembly including a proton exchange membrane disposed between an ultrathin anode and an ultrathin cathode, the at least one membrane electrode assembly disposed intermediate the at least one end plate and the at least one bipolar plate, the anode and the cathode each including a porous conductive material with catalytic particles distributed therein, wherein each of the anode and the cathode is less than 2 μm thick;
   a plurality of diffusion media each having a porous layer and a microporous layer, the porous layer of a first one of the diffusion media disposed adjacent the hydrophilic surface of the flow field of the end plate and the porous layer of a second one of the diffusion media disposed adjacent the hydrophilic surface of the at least one of the flow fields of the at least one bipolar plate; and
   at least two interlayers each having a hydrophilic surface about 1 μm thick, the hydrophilic surface of each of the interlayers is a carbon and ionomer material, a first one of the interlayers disposed between the microporous layer of the first one of the diffusion media and the membrane electrode assembly and a second one of the interlayers disposed between the microporous layer of the second one of the diffusion media and the membrane electrode assembly, the first one of the interlayers contacting the cathode, the second one of the interlayers contacting the anode.

6. The fuel cell stack according to claim 5, wherein the hydrophilic surface of each of the interlayers is produced by at least one of applying a coating of the carbon and ionomer material to a surface of each of the interlayers and forming each of the interlayers from the carbon and ionomer material.

7. The fuel cell stack according to claim 5, wherein each of the interlayers is from about 0.5 μm to about 15 μm thick.

8. The fuel cell stack according to claim 5, wherein each of the interlayers is from about 0.5 μm to about 3 μm thick.

9. A PEM fuel cell stack comprising:
   at least one end plate having a flow field formed on a first surface thereof and a substantially planar second surface, the flow field of the at least one end plate includes a hydrophilic surface;
   at least one bipolar plate having a flow field formed on a first surface and a second surface thereof, wherein each of the flow fields of the at least one bipolar plate includes a plurality of channels interposed between a plurality of lands, at least one of the plurality of channels and the plurality of lands of each of the flow fields of the at least one bipolar plate includes a hydrophilic surface, wherein the hydrophilic surface of the at least one of the plurality of channels and the plurality of lands of each of the flow fields of the at least one bipolar plate is a surface treatment;
   a membrane electrode assembly disposed between the at least one end plate and the at least one bipolar plate, the membrane electrode assembly including a proton exchange membrane disposed between an ultrathin anode and an ultrathin cathode, the ultrathin anode and the ultrathin cathode each including a porous conductive material with catalytic particles distributed therein, wherein each of the anode and the cathode are less than 2 μm thick;
   a first diffusion media disposed adjacent the hydrophilic surface of the end plate, the first diffusion media having a porous layer and a microporous layer, the porous layer of the first diffusion media disposed adjacent the hydrophilic surface of the end plate;

a second diffusion media disposed adjacent the hydrophilic surface of the first surface of the bipolar plate, the second diffusion media having a porous layer and a microporous layer, the porous layer of the second diffusion media disposed adjacent the hydrophilic surface of the first surface of the at least one bipolar plate;

a first interlayer having a hydrophilic surface about 1 μm thick, the hydrophilic surface of the first interlayers is a carbon and ionomer, the hydrophilic surface of the first interlayer disposed between the microporous layer of the first diffusion media and the ultrathin cathode of the membrane electrode assembly, the first interlayer contacting the ultrathin cathode, and a second interlayer having a hydrophilic surface about 1 μm thick, the hydrophilic surface of the second interlayer is a carbon and ionomer, the hydrophilic surface of the second interlayer disposed between the macroporous layer of the second diffusion media and the ultrathin anode of the membrane electrode assembly, the second interlayer contacting the ultrathin anode.

* * * * *